(12) United States Patent
Jalgha (10) Patent No.: US 8,927,838 B2
(45) Date of Patent: Jan. 6, 2015

(54) UNIVERSAL MUSICAL STRING ADJUSTING APPARATUS FOR USE WITH A TUNING DEVICE

(76) Inventor: Bassam Fouad Jalgha, Beirut (LB)

( * ) Notice: Subject to any disclaimer, the term of this patent is extended or adjusted under 35 U.S.C. 154(b) by 7 days.

(21) Appl. No.: 13/816,731

(22) PCT Filed: Sep. 21, 2010

(86) PCT No.: PCT/CA2010/001475
§ 371 (c)(1),
(2), (4) Date: Feb. 12, 2013

(87) PCT Pub. No.: WO2012/037639
PCT Pub. Date: Mar. 29, 2012

(65) Prior Publication Data
US 2013/0213206 A1    Aug. 22, 2013

(51) Int. Cl.
*G10D 3/14* (2006.01)
*G10D 3/00* (2006.01)
*G01G 7/02* (2006.01)

(52) U.S. Cl.
CPC ............... *G10D 3/14* (2013.01); *G10D 3/006* (2013.01); *G01G 7/02* (2013.01)
USPC .............................................. 84/304; 84/455

(58) Field of Classification Search
USPC .................................................... 84/304, 455
See application file for complete search history.

(56) References Cited

U.S. PATENT DOCUMENTS

| | | | | |
|---|---|---|---|---|
| 490,494 A * | 1/1893 | Olsen | .............................. | 84/304 |
| 510,375 A * | 12/1893 | Ayuso | .............................. | 84/306 |
| 911,484 A * | 2/1909 | Pillman | ........................... | 84/269 |
| 2,812,682 A * | 11/1957 | Longone et al. | ................ | 84/458 |
| 3,813,983 A * | 6/1974 | Paul | ................................. | 84/458 |
| 4,088,052 A * | 5/1978 | Hedrick | ........................... | 84/454 |
| 4,791,849 A * | 12/1988 | Kelley | ............................. | 84/458 |
| 4,889,029 A * | 12/1989 | St. Denis | ......................... | 84/454 |
| 5,038,657 A * | 8/1991 | Busley | ............................. | 84/455 |
| D342,001 S * | 12/1993 | Hibbert | ............................ | D8/29 |
| 5,272,953 A * | 12/1993 | Koch | ............................... | 84/458 |
| 5,410,939 A * | 5/1995 | Matamoros et al. | ............ | 84/458 |
| D366,996 S * | 2/1996 | Torres | ............................... | D8/29 |
| 5,505,116 A * | 4/1996 | Pantoja | ............................ | 84/458 |
| 5,696,341 A * | 12/1997 | McCane | ......................... | 84/453 |
| D397,596 S * | 9/1998 | Morin | ............................... | D8/14 |
| D412,011 S * | 7/1999 | Rice et al. | ....................... | 84/458 |
| D421,882 S * | 3/2000 | Mattei | ............................. | 84/458 |
| 6,201,173 B1 * | 3/2001 | Black | ............................ | 84/422.1 |
| 6,255,575 B1 * | 7/2001 | Pearse | ............................. | 84/458 |

(Continued)

*Primary Examiner* — Robert W Horn
(74) *Attorney, Agent, or Firm* — James M Smedley LLC; James Michael Smedley, Esq.; Joseph Parish, Esq.

(57) ABSTRACT

There is provided a string adjusting apparatus configured to be used with a string tuning device and with a variety of tuning pegs associated with a variety of stringed musical instruments, the string adjusting apparatus comprising a plurality of peg connectors configured to be detachably coupled to the variety of tuning pegs, and a motor configured to be connected to the automatic tuning device and to be detachably coupled to the plurality of peg connectors. The apparatus further comprising a user interface and a processing unit for enabling a user to select a stringed musical instrument to tune among a displayed list of musical instruments and a processing unit connected to the user interface for receiving the user selection and for automatically determining, as a function thereof, an appropriate tuning frequency, an appropriate peg connector among the plurality of peg connectors and an appropriate torque to be applied by the motor.

10 Claims, 7 Drawing Sheets

(56) References Cited

U.S. PATENT DOCUMENTS

| | | | |
|---|---|---|---|
| 6,278,047 B1* | 8/2001 | Cumberland | 84/455 |
| 6,294,719 B1* | 9/2001 | Palecki et al. | 84/458 |
| 6,841,726 B2* | 1/2005 | Steffens et al. | 84/486 |
| 6,978,563 B2* | 12/2005 | Jung | 40/343 |
| 7,301,089 B1* | 11/2007 | Liao | 84/453 |
| D561,545 S * | 2/2008 | Jahn | D8/21 |
| 7,446,248 B2* | 11/2008 | Skinn et al. | 84/312 R |
| 7,608,771 B2* | 10/2009 | Fournier et al. | 84/422.1 |
| 7,659,466 B1* | 2/2010 | Jang | 84/304 |
| 7,802,499 B2* | 9/2010 | Stephens | 81/124.2 |
| 7,935,876 B1* | 5/2011 | West | 84/304 |
| 8,253,002 B2* | 8/2012 | Christmas | 84/421 |
| 2006/0107816 A1* | 5/2006 | Vinoly et al. | 84/47 |
| 2007/0084328 A1* | 4/2007 | Kashioka | 84/413 |
| 2010/0089219 A1* | 4/2010 | D'Arco | 84/454 |
| 2013/0213206 A1* | 8/2013 | Jalgha | 84/304 |

* cited by examiner

UNIVERSAL MUSICAL STRING ADJUSTING APPARATUS FOR USE WITH A TUNING DEVICE

CROSS-REFERENCE TO RELATED APPLICATIONS

This application is a continuation of International Application No. PCT/CA2010/001475, filed Sep. 21, 2010, the entire disclosure of which is incorporated herein by reference.

FIELD OF THE INVENTION

The present disclosure relates to tuning musical instruments, and more particularly to a string adjusting apparatus configured to be used with a string tuning device and with a variety of tuning pegs associated with a variety of stringed musical instruments.

BACKGROUND OF THE INVENTION

Tuning is the process of adjusting the pitch of one or many tones from musical instruments to establish typical intervals between these tones. Tuning is usually based on a fixed reference frequency. A musical instrument is "out of tune" when a pitch/tone is either too high (sharp) or too low (flat) in relation to a given reference frequency. While an instrument might be in tune relative to its own range of notes, it may not be considered "in tune" if it does not match the reference frequency. Musical instruments generally become 'out of tune' with use, damage or time and have to be repaired by re-tuning the instrument. Moreover, stringed musical instruments (such as guitars) are very susceptible to go "out of tune" during performances as a result of humidity, temperature and continuous tensions applied on strings during the performance.

Manual tuning of a stringed musical instrument is a very difficult and tedious task, and generally requires an important amount of time, experience and skills. Manual tuning is very inconvenient for beginner musicians who usually do not have the required skills and experience to tune a musical instrument. The inconvenient of manually tuning a musical instrument are numerous. For example, manual tuning can have a negative effect on trainees where time consumed thereby to tune an instrument is generally taken out from their instrument training time, having as a consequence a loss of motivation in their training. Moreover, during performances, musicians usually do not have the opportunity to manually tune their instruments. In fact, retuning a musical instrument during a performance will result in an interruption of the performance in front of the audience. Besides, where the musician doesn't have the capabilities to tune the instrument, specialized technicians should be available during the performance period in order to retune the instrument when required. As an alternative to tuning instruments during performances, musicians should be equipped with extra pre-tuned instruments in order to replace the "out of tune" ones when necessary.

To remedy the problem of manual tuning, a number of automatic tuning devices, systems and apparatuses have been proposed. U.S. Pat. No. 4,803,908 describes an automatic musical instrument tuning system in which an adjustment mean for changing the frequency of a musical tone is devised. The described embodiment shows the motors as being built inside the musical instrument. The mechanical means for changing the tuning is directly connected to the strings from the bridge side of the instrument. This has many disadvantages such as modifying the sound of the instrument. Another disadvantage of said tuning system is its lack of versatility (adaptability) in the sense that different musical instruments would require different tuning mechanisms embedded therein.

U.S. patent application Ser. No. 11/207,187 describes a string musical tuner that contains a processor and a string adjustment assembly. This assembly is capable of reversibly changing the position of a string contact surface in the string adjustment assembly with respect to the string, hence modifying the tuning. The proposed mechanism is embedded in the musical instrument and thus can never be separated therefrom. In fact, this instrument must contain the embodiment of the mechanism which can be built into the guitar as an integral part or retrofitted into an existing guitar.

Other US patents/patent applications exist in the field, such as U.S. Pat. No. 4,014,242, U.S. Pat. No. 5,388,496 and U.S. Pat. No. 4,803,908 and U.S. patent application Ser. No. 09/835,259 and Ser. No. 11/207,187. In all the previous prior art, either no automatic tuning of the string is devised or, if an automatic tuning is suggested, the mechanical tuning mechanism had to be built inside the instrument.

The traditional tuning devices have many disadvantages, such as being mechanically complex and costly. Besides, the suggested mechanical assemblage means built inside the instrument has the drawback of modifying the sound thereof and being adapted to be used in connection with only one musical instrument. Thus, in order to be able to tune different types of musical instruments, a plurality of tuning devices would be required.

SUMMARY OF THE INVENTION

It is therefore an object of the present disclosure to provide a device, a system and a method that overcome the above drawbacks.

As a first aspect of the disclosure, there is provided a string adjusting apparatus configured to be used with a string tuning device and with a variety of tuning pegs associated with a variety of stringed musical instruments, the string adjusting apparatus comprising a plurality of peg connectors configured to be detachably coupled to the variety of tuning pegs; and a motor configured to be connected to the automatic tuning device and to be detachably coupled to the plurality of peg connectors.

Preferably, the motor comprises a gear and a rotating shaft having a first portion (not shown) and a second portion, where the shaft first portion is coupled to the gear and the shaft second portion is configured to be detachably coupled to any one among the plurality of peg connectors.

Preferably, each one of the plurality of peg connectors comprises a peg connector first portion and a peg connector second portion, where each one of the peg connectors' first portions is configured to be detachably coupled to one among the variety of pegs and each one of the peg connectors' second portions is configured to be detachably coupled to the shaft second portion.

Preferably, each one of the peg connectors' first portions comprises a socket having an internal socket portion and an outside edge socket portion, where each one of the internal socket portions is configured to encompass one among the tuning pegs within its corresponding outside edge socket portion.

Preferably, the internal socket portions are configured to provide shock absorbance to the tuning pegs when inserted therein and when a torque is applied to the rotating shaft, and the outside edge socket portions are configured to firmly hold the tuning pegs when the torque is applied.

The sockets can further comprise soft spongy material extending between the internal socket portions and the outside edge socket portions in order to provide for the shock absorbance, and the outside edge socket portions are preferably made of a rigid material in order to firmly hold the tuning pegs when the torque is applied.

Preferably, the peg connectors' first portions comprise a hose adapted to firmly encompass at least a part of the shaft second portion when coupled.

Preferably, the shaft second portion extends along a longitudinal axis and comprises a first groove extending along a groove axis transversal to the longitudinal axis, and each one of the hoses comprises a second groove having an appropriate size and location, such that, when the peg connector is coupled to the shaft, the first and second grooves and align and allow for inserting a pin therein for securing the coupling.

The motor can comprise a wireless communication interface adapted to be connected to a wireless data network allowing for a wireless connection with the automatic string tuning device. Moreover, the motor preferably comprises a rechargeable power battery and is a hand held motor.

Preferably, the string adjusting apparatus further comprises fastening means for securely and detachably affixing the motor to any stringed musical instrument during a tuning process.

Preferably, the string adjusting apparatus further comprises a user interface for enabling a user to select a stringed musical instrument to tune among a displayed list of musical instruments; and a processing unit connected to the user interface for receiving the user selection and for automatically determining an appropriate tuning frequency as a function thereof.

Preferably, the processing unit transmits the determined appropriate tuning frequency to the user interface in order to be communicated to the user.

Preferably, the processing unit is adapted to be connected to the tuning device for communicating thereto the appropriate tuning frequency in order to initiate a tuning process as a function thereof.

Preferably, the processing unit further determines an appropriate peg connector among the plurality of peg connectors as a function of the selected musical instrument and transmits an indication of the appropriate peg connector to the user interface in order to be communicated to the user.

Preferably, the processing unit is further configured to determine an appropriate torque to be applied by the motor as a function of the determined appropriate peg connector, and is further adapted to be connected to the motor for transmitting thereto an indication of the determined appropriate torque to be applied. Preferably, the string adjusting apparatus further comprises a communication interface connected to the processing unit and adapted to be connected to a data network for communicating with the tuning device and the motor. Preferably, the communication interface is a wireless communication interface and the data network is a wireless data network.

As a further aspect of the disclosure, there is provided a universal string tuning apparatus comprising a tuning device for tuning a stringed musical instrument; a plurality of peg connectors configured to be detachably coupled to a variety of tuning pegs associated with a variety of musical instruments; a motor connected to the tuning device and adapted to be detachably coupled to the plurality of peg connectors; a portable housing for securely and compactly enclosing the tuning device, the plurality of peg connectors and the motor, where the housing comprises an opening allowing for packing and unpacking the plurality of peg connectors and the motor when required.

The above-mentioned aspects of the disclosure are designed to solve the drawbacks and disadvantages of the prior art. First, the provided string adjusting apparatus is a universal apparatus capable of easily connecting to any musical instrument and providing an easy and time saving tuning. One key characteristic thereof is thus is its ability to operate in association with any stringed musical instrument, such as a guitar, violin, viola, cello, contrabass and piano.

The universal string tuning apparatus is a universal and portable apparatus. The detector thereof preferably comprises a microphone for detecting a tone of a musical instrument. This microphone is connected to a housing that encloses a user interface comprising a screen and push buttons as well the tuning device, the plurality of connectors and the motor. The housing holds a motor that can be pulled out when used. The motor's shaft can be coupled to a detachable tuning peg connector. This tuning peg connector has a socket that receives the tuning peg of the string to be tuned. Tuning peg connectors are provided with various sizes that can fit to any string instrument.

As a further aspect of the disclosure, there is provided a process in which the musician will be able to tune his instrument automatically and with minimum intervention. As a first step, the tuning peg connector that fits the size of the tuning peg of the instrument is coupled to the shaft of the (hand held) motor. Afterwards, the note to be tuned will be chosen using the push buttons and the screen. That way, the desired frequency of the string will be set. Once the decision is made, the tuning peg connector should be coupled with the tuning peg of the string to be tuned. The musician will only have to pluck the string and the sound will be detected by the microphone. Afterwards, the signal will go through appropriate filtering and amplification. The tuning device, using FFT algorithm, would detect the fundamental frequency of the sound and will compare it to a preset desired value and will send a signal to the motor to start rotating in the correct direction with a speed proportional to the error.

In fact, none of the traditional systems provide for a universal platform that can be used in association with any stringed musical instrument.

BRIEF DESCRIPTION OF THE DRAWINGS

Further features and advantages of the present disclosure will become apparent from the following detailed description, taken in combination with the appended drawings, in which.

DETAILED DESCRIPTION OF THE INVENTION

Figure 6:
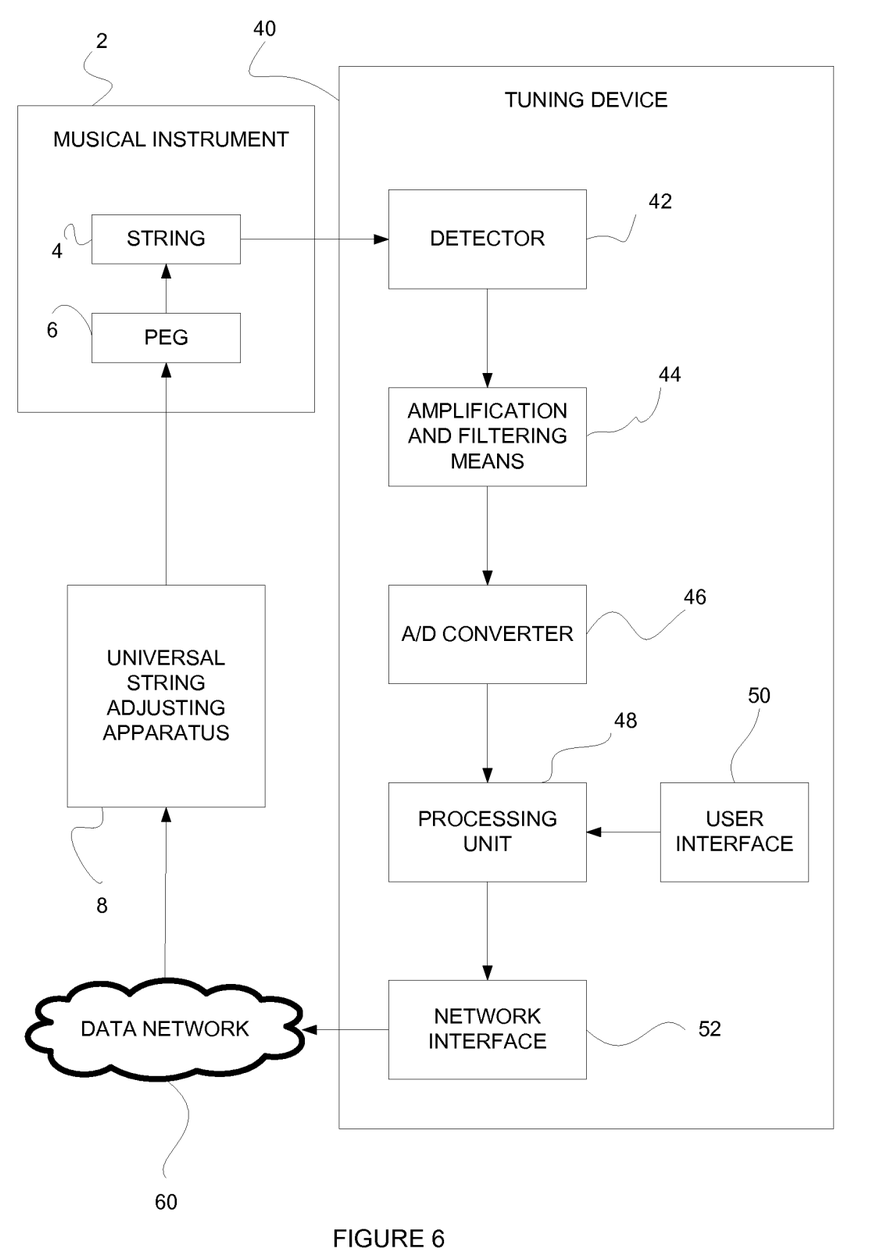
FIG. 6 depicts a block diagram illustrating interconnection between the different components of a tuning device, a musical instrument and universal string adjusting apparatus in accordance with an example of an embodiment of the present invention.

As illustrated in FIG. 6, there is provided a universal string tuning apparatus for tuning a stringed musical instrument 2, the apparatus comprising a tuning device 40 and a universal string adjusting apparatus 8.

The tuning device 40 comprises a first user interface 50, a detector 42, amplification and filtering means 44, an analog-digital converter 46 and a first processing unit 48.

The universal string tuning apparatus can also comprise a main housing configured such that the components of the tuning apparatus can be incorporated therein in a secured and compact manner. Preferably, the main housing has a rectangular shape and is made of a light material, such as reinforced plastic, in order to facilitate its transportation. In a preferred embodiment, the main housing comprises an opening allowing for securely packing and unpacking the universal string adjusting apparatus 8.

The first user interface 50 is connected to the first processing unit 48 for transmitting thereto any data entered by the user 1 and for displaying to the user 1 any data transmitted by the first processing unit 48. In a preferred embodiment, the first user interface 50 comprises a screen and push buttons allowing the user 1 to instruct the device about the note to be tuned, where the screen displays information transmitted by the first processing unit 48 back to the user 1.

The first user interface 50 can also consist of a micro touch screen enabling the user to interactively communicate with what is displayed on the screen using his finger; however the first user interface 50 can also consist of any other two-way communicational interface such as combination of a micro keyboard and display or a two-way audio interface. Optionally, the first user interface 50 may be extended through a wireless remote keyboard and display device (not shown), such as a dedicated device, a cellular phone, a PDA, or any other suitable device which may communicate wirelessly with the tuning device through a wireless network such as a Bluetooth™ and Wi-Fi wireless network.

The information entered by the user through the first user interface 50 can consist of a number representing the tuning frequency. The first processing unit 48 can also be configured in such a manner that the first user interface 50 can display to the user 1 a list of musical instruments among which he/she can select a given musical instrument to be tuned. Since each musical instrument can have a plurality of tones, once the appropriate musical instrument is selected from the list, the user interface 50 then displays to the user a list of strings among which he can select a particular string to be tuned. The information is transmitted to the processing unit 48 which processes the information and generates a suggested reference frequency which is communicated to the user via the user interface. The user has then the faculty to confirm the suggested tuning frequency or to ignore it and to enter manually the desired tuning frequency. Though, according to a preferred embodiment, the user information is entered manually by the user using a touch screen, it should be understood it can be entered using any other alternative process such as a voice recognition process as mentioned hereinabove.

The first user interface 50 displays certain information and allows the user to enter data when he is instructed to do so via a message appearing on the screen. All operations of the micro touch screen are securely synchronized and controlled by the first processing unit 48 in the sense that no data is communicated to the first user interface 50 for display and no data entered by the user via that user interface 50 is processed unless authorized by the first processing unit 48. In other terms, the first user interface 50 communicates to the user various information, comprising messages and instructions, such as instructions to enter a desired tuning frequency or a desired musical instrument and a status of the tuning process at a given temporal moment.

Figure 5:
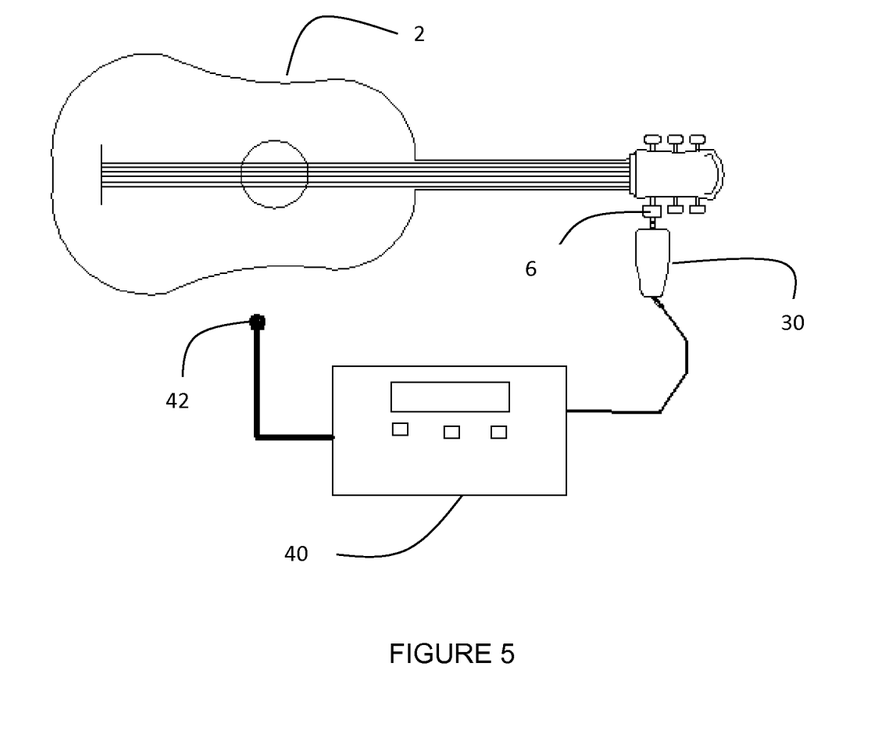
FIG. 5 depicts a global view of motor connected to a musical instrument (i.e. guitar) and to a tuning device in accordance with an example of an embodiment of the present invention.

The detector 42 is configured to detect the signal generated by the musical instrument 2 and is connected to the amplification and filtering means 44 for transmitting thereto the received signal for further processing. In the preferred embodiment, the detector 42 comprises a microphone that can be positioned in front of the musical instrument 2 to be tuned in order to detect a first signal produced thereby. The detector 42 also comprises a malleable body having a top end on which the microphone is affixed and a bottom end which is coupled to the main housing. While it keeps the microphone affixed to the main housing, the malleable body allows the microphone to be easily positioned in front of the instrument 2 to be tuned in such a manner that it accurately detects the appropriate instrument sound and minimize capture of any external noise. A person skilled in the art should understand that the microphone can be replaced by any other convenient means for detecting a musical tone. (See FIG. 5)

Once the instrument is plucked, the signal produced by the musical instrument 2 is captured and detected by the microphone. The electrical signal captured by the microphone would undergo signal processing. In this optic, the detector 42 is connected to amplification and filtering means 44 for amplifying the captured analog signal, for eliminating interfering signals (noise) from the captured signal and for producing a filtered signal as a function thereof. The amplification and filtering means 44 are further connected to an analog-digital converter 46 for converting said filtered analog signal into a filtered digital signal. The analog digital converter 46 is connected to the processing unit 48 for transmitting thereto the filtered digital signal for further processing. In fact, the processing unit receives the filtered digital signal and processes it in order to detect the fundamental frequency which is then compared to the tuning frequency specified by the user 1. As a function of said comparison, an error margin is determined between said frequencies and a control signal is generated as a function thereof and transmitted to the universal string adjusting apparatus 8.

The amplification process is performed in such a manner that the captured analog signal can be properly detected by the Analog/Digital converter 46. The amplification means comprise a signal amplifier configured to detect and amplify any signal within the frequency range of musical instruments. The filtering means 44 comprise a low pass filter in which all frequencies above the highest sound frequency of any given free string in any string musical instrument are rejected. Afterwards, the signal is transmitted to the first processing unit 48 which will process the received signal using an appropriate data processing algorithm in order to detect the frequency components present in the sound signal. In the preferred embodiment, the data processing algorithm is a Fast Fourier Transform (FFT) algorithm. Globally, the first processing unit 48 is connected to the user interface and to the analog-digital converter for determining the fundamental frequency of the digital signal and for comparing the fundamental frequency to the tuning frequency specified by the user 1 using the user interface 50.

The frequency components of the signal should be detected with the lowest error possible. Hence in FFT terms, the number of FFT points is determined as close as possible to the number of sound samples. Also, by minimizing the A/D conversion sampling rate, the digital data to be stored after conversion is minimized such that the required memory storage capacity is optimized. The sampling rate applied is equivalent to two times the highest sound frequency that can be generated by any stringed musical instrument, so that the Nyquist rate can be respected for any musical instrument to be tuned. In order to have a fast response, the recording time of the sound data is minimized and the remained data points are filled by the same recorded sound data in order to meet the minimum FFT error criteria. Thus, both the fast response criteria and the minimum FFT error criteria are met.

Once the processing unit compiles the received digital sound signal using the FFT algorithm, all frequency components associated with the sound signal are determined. The processing unit then determines the fundamental frequency (pitch) of the sound signal by eliminating the harmonics present in the signal. The fundamental frequency is the lowest frequency component having the highest amplitude among all other frequency components present in the signal. Once the fundamental frequency is determined, the processing unit then determines the error between the detected fundamental frequency and the specified tuning frequency set by the user 1. As a function of the determined error, a control signal is generated and transmitted to the universal string adjusting means 8. The control signal comprises motor revolving instructions comprising a revolving speed and a revolving direction.

The motor 30 receives the control signal and revolves in accordance with the control signal in order to tune the musical string. The revolving speed is directly proportional to the magnitude of the determined error. In other terms, if the error is high, the motor rotation speed will be high, and if the error is small, the motor speed will be low. When the determined error is zero, the motor 30 stops turning and the tuning process takes end. The revolving direction depends whether a higher or a lower frequency is required for adjusting the musical string.

The first processing unit 48 is further connected to a first network interface 52 which is connected to the universal string adjusting apparatus 8 via a data network 60. The first processing unit 48 generates a control signal as a function of the difference between the fundamental frequency and the tuning frequency and transmits it to the motor 30. The first processing unit 48 can be connected to the universal string adjusting apparatus 8 through a wire (ex. Multiconductor wire or Universal Serial Bus) or a wireless data network. However, according to the preferred embodiment, the connection between the first processing unit 48 and the universal string adjusting apparatus 8 is a wireless remote connection which provides further portability to the universal string adjusting apparatus 8. In this optic, a first network interface 52 is connected to the first processing unit 48 and a second network interface 39 is connected to the motor 30. The first and second network interfaces 39 and 52 are both connected to the wireless data network 60 for exchanging data therebetween. The first network interface 52 receives the control signal generated by the first processing unit 48 and transmits it wirelessly, through the wireless data network 60, to the motor 30 which is received through the second network interface 39 connected thereto. The wireless data network 60 can consist of a Bluetooth, a Wi-Fi network, or the like.

Figure 1:
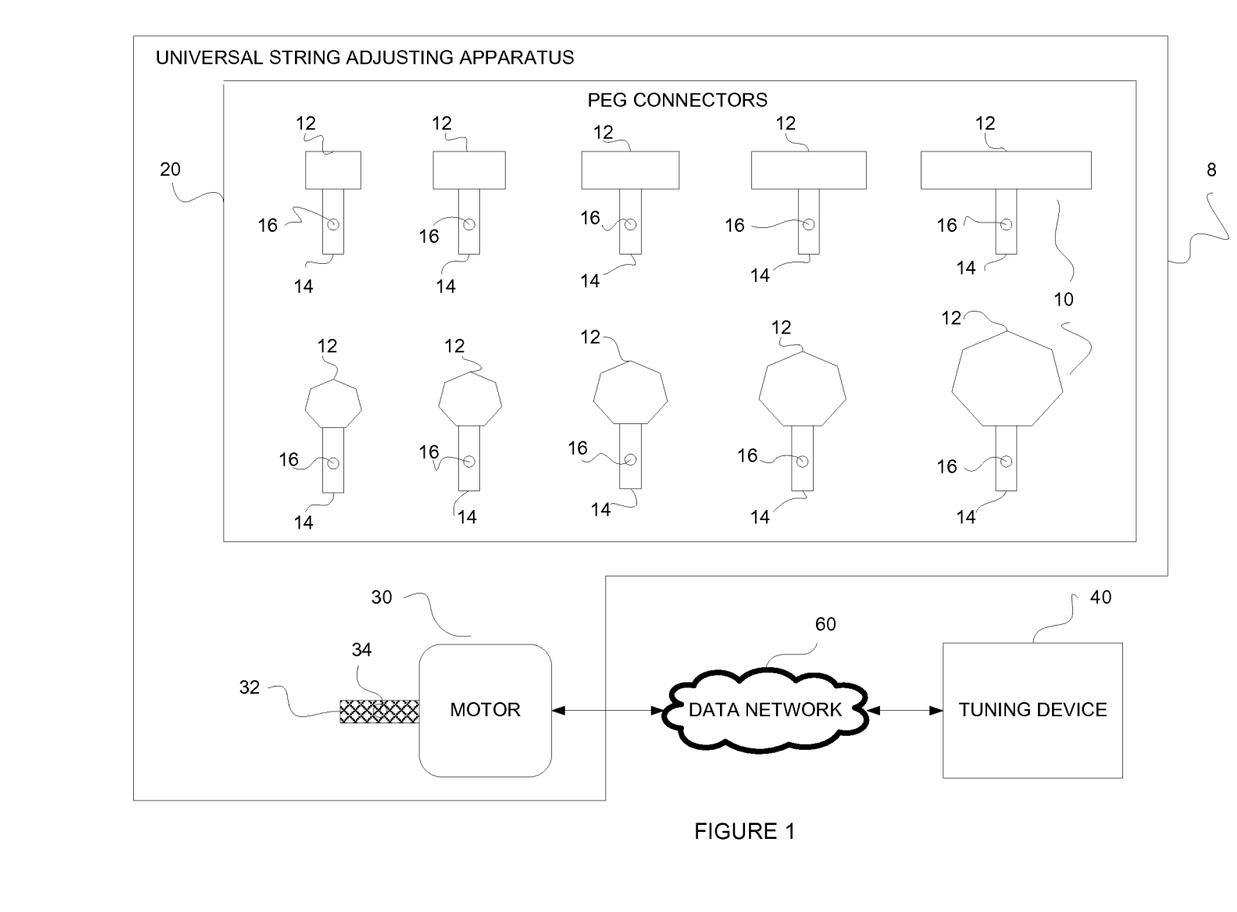
FIG. 1 illustrates a universal string adjusting apparatus comprising a plurality of peg connectors and a motor communicates with a tuning device via a data network in accordance with an example of an embodiment of the present invention.
Figure 2:
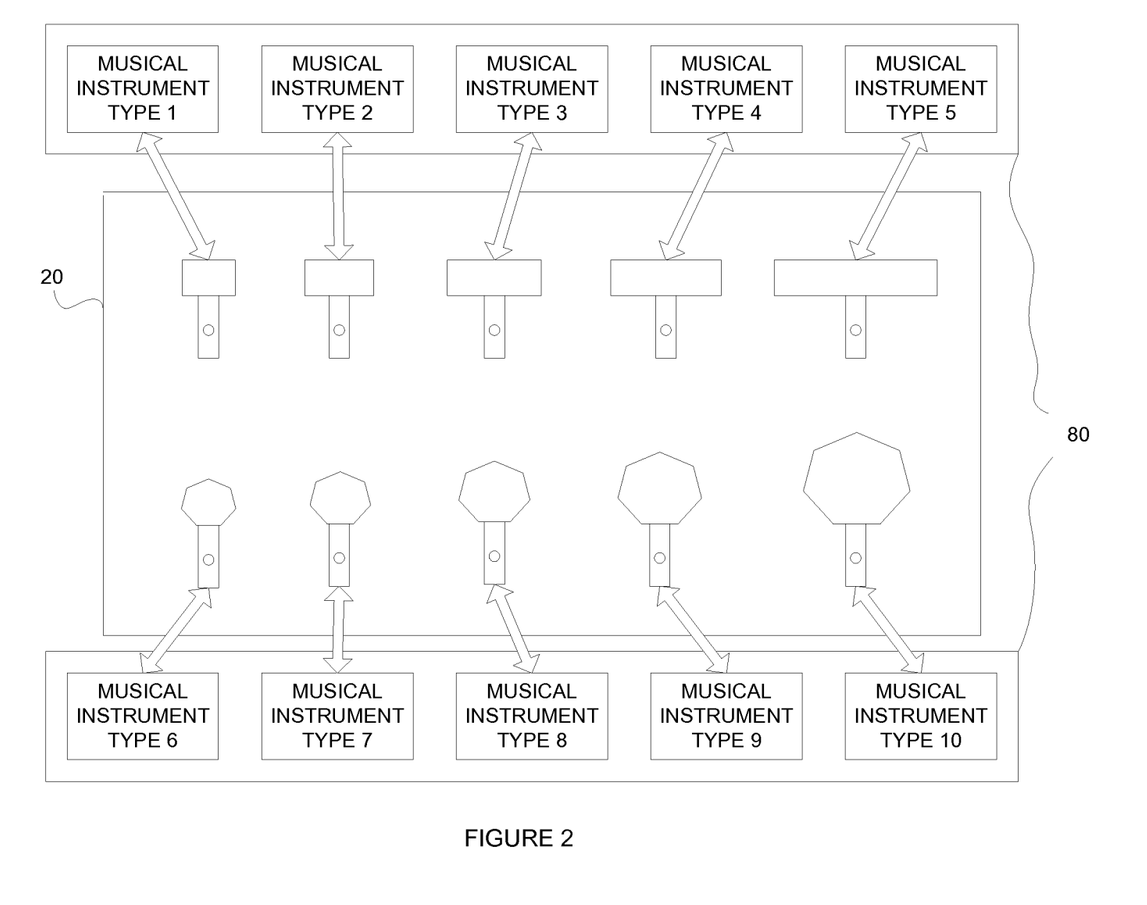
FIG. 2 illustrates an association between the plurality of peg connectors and a variety of musical instruments in accordance with an example of an embodiment of the present invention.
Figure 3:
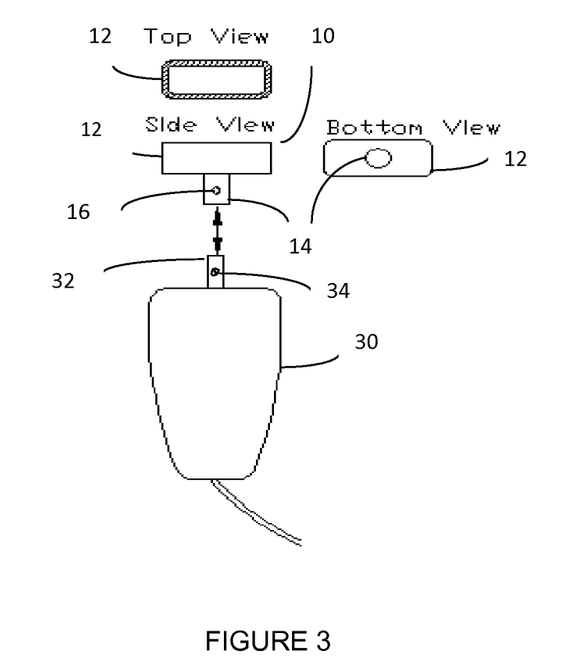
FIG. 3 depicts different views of a peg connector and how it can be coupled to the motor in accordance with an example of an embodiment of the present invention.
Figure 4:
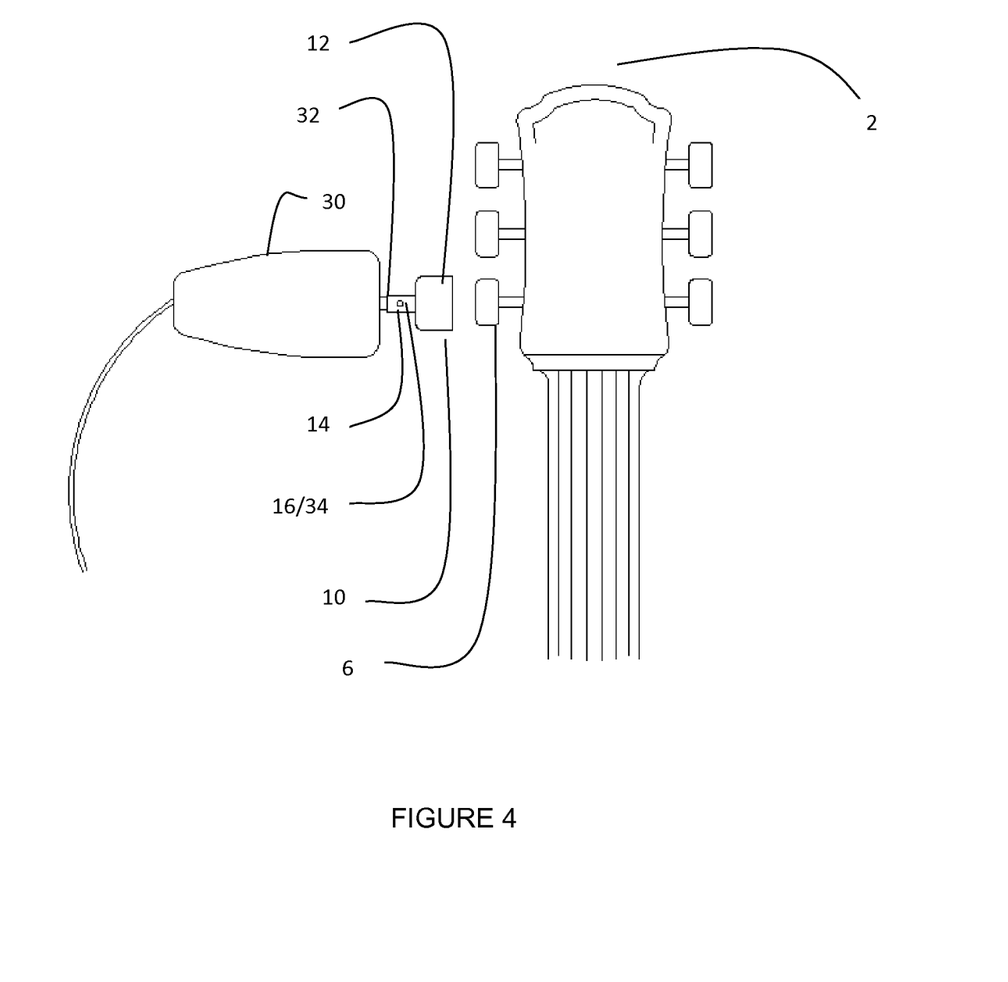
FIG. 4 illustrates how a motor is coupled to a peg connector and how a peg connector is coupled to a peg of a musical instrument (i.e. Guitar) in accordance with an example of an embodiment of the present invention.

The universal string adjusting apparatus 8 comprises a motor 30 and a plurality of peg connectors 20 having different types and sizes and can fit with a variety of pegs associated with a variety of musical instruments 80 (see FIGS. 1 and 2). The motor 30 comprises a rotating shaft 32 configured to be coupled to any one among said peg connectors 20. Each one 10 among the plurality of peg connectors 20 has a first portion 14 and a second portion 12, where the first portion 14 is adapted to be detachably coupled to the motor rotating shaft 32 and the second portion 12 is adapted to be detachably coupled to a peg associated with a musical instrument. Each peg connector 10 among the plurality of peg connectors 20 has a second portion 12 that differs in type and/or size of its counterparts associated with the other peg connectors, in the sense that it has a particular type and size and is adapted to be coupled to a peg having a corresponding type and size. On the other hand, all the peg connectors 20 have a standard first portion 14 that is adapted to be coupled to the motor rotating shaft 32. Since, different musical instruments 80 have different peg types and sizes, the user will be able to tune any musical instrument among a variety of musical instruments 80 by choosing an appropriate peg connector 10 among the plurality of peg connectors 20 as a function of the size and type of the peg associated with the musical instrument to be tuned. The user then couples the first portion 14 of the peg connector to the motor rotating shaft 32 and the second portion 12 thereof to the peg 6 associated with the musical instrument 2. Thus, since the motor 30 is configured to be coupled to any one among the plurality of peg connectors provided 20, it will be able to tune any musical instrument among the variety of musical instruments 80 doesn't matter the type and size of its associated pegs 6. An important characteristic of the tuning peg connector 10 is its ability to detach from the shaft 32 and from the peg 6, so that it can be replaced by another appropriate peg connector 10 when required. An appropriate peg connector 10 is determined as a function of characteristics (i.e. type and size) of the peg 6 associated with the musical instrument 2 to be tuned. (See FIGS. 1, 2, 3, 4 AND 5)

The motor rotating shaft 32 has a cylindrical or a semi cylindrical shape and extends along a longitudinal axis. It has a shaft first portion (not shown) and a shaft second portion 32. The shaft first portion extends inwardly towards the internal motor components and is coupled to the inside rotor (or gear), whereas the shaft second portion 32 extends outwardly (in the opposite direction) and is adapted to be coupled to any one among the plurality of peg connectors 20. When the motor 30 is on, the shaft second portion 32 is given a torque by the rotor (gear) and rotates as a function of the control signal received from the first processing unit 48. Preferably, the shaft second portion 32 is perforated along an axis transversal to the longitudinal axis in order to form a groove 34 extending along the transversal axis. The peg connector first portion 14 also comprises a groove 16 having an appropriate size and emplacement such that both grooves 16 and 34 (the peg connector groove and the shaft groove) align when the peg connector 10 is coupled to the shaft 32. The aligned grooves 16 and 34 are adapted to receive a pin (or a screw) (not shown) in order to fixedly couple the peg connector 10 to the shaft 32. The pin can be easily withdrawn when the peg connector 10 is to be decoupled from the rotating shaft 32. (See FIG. 3 AND FIG. 4)

Each peg connector 10 of the plurality of peg connectors 20 comprises a second portion 12 for coupling a particular peg 6 associated with a given musical instrument among the variety of stringed musical instruments 80 (see FIG. 2). In a preferred embodiment, the second portion 12 comprises a socket having a shape and size that substantially correspond to a type and size of a given tuning peg. The socket has an external portion and an internal portion. The internal portion is preferably covered with soft spongy material that is adapted to provide shock absorbance to the tuning peg when inserted therein. This would insure longer life span for the peg especially if it is made of fragile material such as wood.

Figure 7:
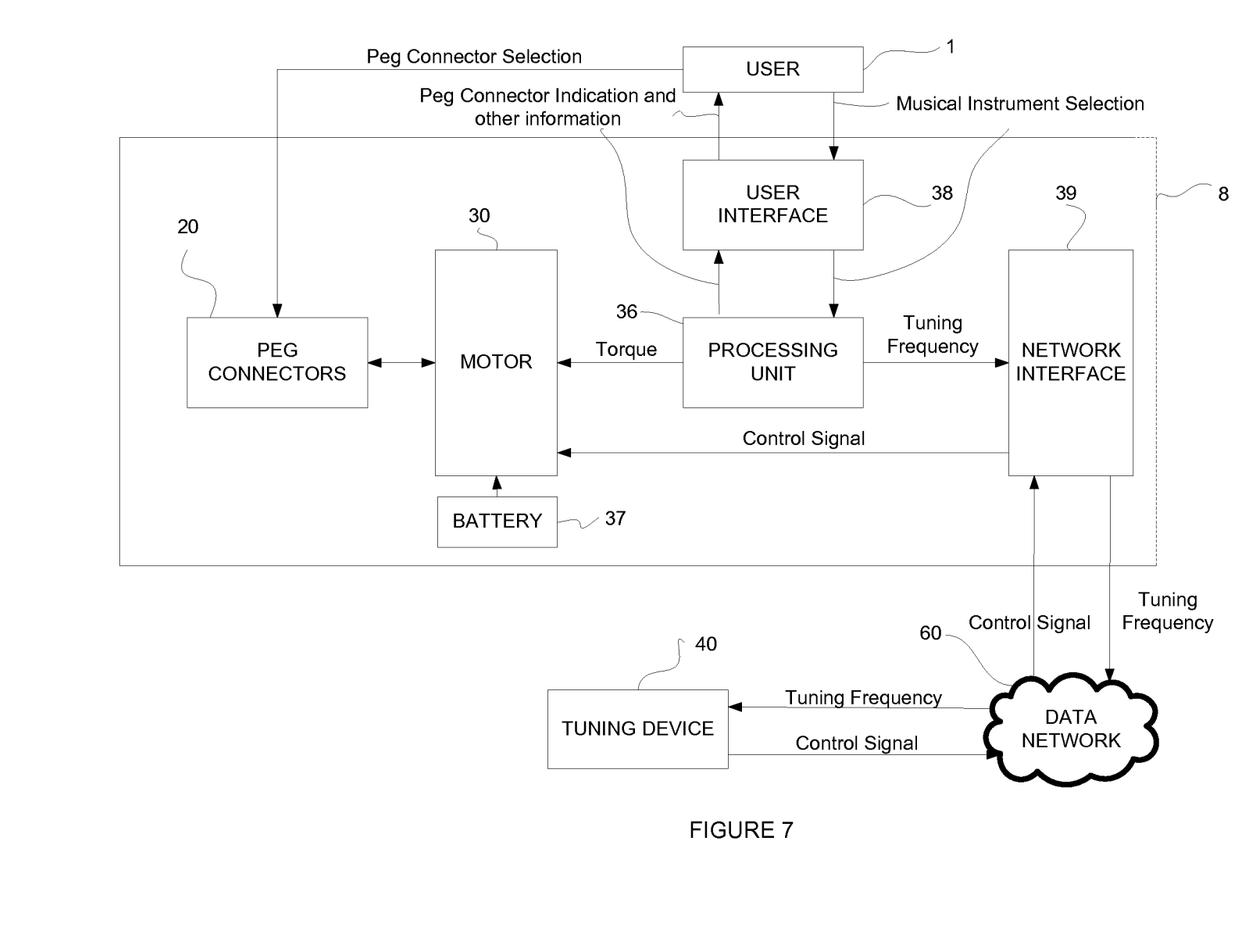
FIG. 7 depicts a block diagram illustrating the different components of a universal string adjusting apparatus and how said components are connected to a tuning device in accordance with an example of an embodiment of the present invention.

As illustrated in FIG. 7, the string adjusting apparatus 8 further comprises a second user interface 38 and a second processing unit 36 connected therebetween. The second user interface 38 and the second processing unit 36 can be configured for enabling a user 1 to select, using the second user interface 38, a stringed musical instrument to tune among a displayed list of musical instruments, for receiving the user selection and for automatically determining by the second processing unit 36 an appropriate tuning frequency as a function thereof. This is particularly the case when the first user interface 50 and the first processing unit 48 are not configured to do so.

The second processing unit 36 transmits the determined appropriate tuning frequency to the user interface 38 in order to be communicated to the user 1. The second processing unit 36 is adapted to be connected to the automatic tuning device 40 for communicating thereto the appropriate tuning frequency in order to initiate a tuning process as a function thereof.

The second processing unit 36 further determines an appropriate peg connector 10 among the plurality of peg connectors 20 as a function of the selected musical instrument and transmits an indication of the appropriate peg connector to the second user interface 38 in order to be communicated to the user 1. The second processing unit 36 is further configured to determine an appropriate torque to be applied by the motor as a function of the determined appropriate peg connector, and is further adapted to be connected to the motor 30 for transmitting thereto an indication of the determined appropriate torque to be applied.

The string adjusting apparatus 8 further comprises a second communication interface 39 connected to the second processing unit 36 and adapted to be connected to the data network 60 for communicating with the tuning device 40 and the motor 30.

The second communication interface 39 is preferably a wireless communication interface and the data network 60 is a wireless data network.

It shall be understood that the first and second processing units 48 and 39 can consist of a same physical unit and the first and second user interfaces 38 and 50 can consist of a same physical user interface.

The universal tuning apparatus comprises a power source for supplying all the components of the device, among others, the user interface 50, the processing unit 48 and the motor 30. The power source can comprise at least one rechargeable power battery 37 that is incorporated inside the main housing. Preferably, the motor 30 comprises an independent rechargeable power battery 37 integrated therein such that no electrical cable is required between the main housing and the motor 30. The rechargeable power battery 37 provides power to the motor and is preferably recharged through a USB connection. Alternatively, the rechargeable battery 37 can also be recharged with an independent power source.

Another particular characteristic of the motor 30 is that it is configured to be packed securely and immovably inside the main housing when unused and to be unpacked outside of the housing when it is to be used to tune a musical instrument 2. The motor 30 is connected to a power source which is preferably a battery 37 connected thereto. In the case where the battery 37 is located inside the main housing, an electrical cable is provided to connect the motor 30 to the battery 37. The motor 30 is characterized by a low speed versus high torque profile which allows it to tune musical stringed instruments 80 with ease. Besides, in the preferred embodiment, the motor 30 is a hand held motor that is held by the user during the tuning process. In another embodiment, the motor 30 is instead held using a clamping mechanism that clamps the motor to the peg box, in such a manner that the motor is affixed without the need for the user to keep holding it manually during the tuning process.

From the user end, the process is carried out as follows: the user unpacks the motor from the main housing, species the tuning frequency using the user interface, connects the first end of the tuning peg connector to the shaft of the motor, connects the second end of the tuning peg connector to the tuning peg of the musical string to tune, positions the microphone in front of the musical instrument using the malleable tube, and activates the tuning process using the user interface so that the musical tone is captured and processed and a control signal is generated by the processing unit and transmitted to the motor in order to run in an appropriate manner in order to tune the musical string in accordance with the control signal.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present preferred embodiment.

Although the above description contains many specificities, these should not be construed as limitations on the scope of the disclosure but is merely representative of the presently preferred embodiments of this disclosure. The embodiments of the disclosure described above are intended to be exemplary only. The scope of the disclosure is therefore intended to be limited solely by the scope of the appended claims.

The invention claimed is:

1. A string adjusting apparatus configured to be used with a string tuning device and with a variety of tuning pegs associated with a variety of stringed musical instruments, the string adjusting apparatus comprising:
   a plurality of peg connectors configured to be detachably coupled to said variety of tuning pegs; and
   a motor configured to be connected to said automatic tuning device and to be detachably coupled to said plurality of peg connectors
   wherein said motor comprises a gear and a rotating shaft having a first portion and a second portion, where said shaft first portion is coupled to said gear and said shaft second portion is configured to be detachably coupled to any one among said plurality of peg connectors
   wherein each one of said plurality of peg connectors comprises a peg connector first portion and a peg connector second portion, where each one of said peg connectors' first portions is configured to be detachably coupled to one among said variety of pegs and each one of said peg connectors' second portions is configured to be detachably coupled to said shaft second portion wherein each one of said peg connectors' first portions comprises a socket having an internal socket portion and an outside edge socket portion, where each one of said internal socket portions is configured to encompass one among said tuning pegs within its corresponding outside edge socket portion wherein said sockets further comprise soft spongy material extending between said absorbance to said tuning pegs when inserted therein and when a torque is applied to said rotating shaft, and wherein said outside edge socket portions are made of a rigid material in order to firmly hold said tuning pegs when said torque is applied.

2. The string adjusting apparatus as claimed in claim 1, wherein said peg connectors' first portions comprise a rigid tubular receptacle adapted to firmly encompass at least a part of said shaft second portion when coupled, and wherein said shaft second portion extends along a longitudinal axis and comprises a first pin hole extending along a second axis transverse to said longitudinal axis, and wherein each one of said rigid tubular receptacles tacks comprises a second pin hole having an appropriate size and location, such that, when said peg connector is coupled to said shaft, said first and second pin holes align and allow for inserting a pin therein for securing said coupling.

3. A string adjusting apparatus configured to be used with a string tuning device and with a variety of tuning pegs associated with a variety of stringed musical instruments, the string adjusting apparatus comprising:
 a plurality of peg connectors configured to be detachably coupled to said variety of tuning pegs;
 a motor configured to be connected to said automatic tuning device and to be detachably coupled to said plurality of peg connectors;
 a user interface for enabling a user to select a stringed musical instrument to tune among a displayed list of musical instruments; and
 a processing unit connected to said user interface for receiving said user selection and for automatically determining an appropriate tuning frequency as a function thereof.

4. The string adjusting apparatus as claimed in claim 3, wherein said processing unit transmits said determined appropriate tuning frequency to said user interface in order to be communicated to said user.

5. The string adjusting apparatus as claimed in claim 3, wherein said processing unit is adapted to be connected to said tuning device for communicating thereto said appropriate tuning frequency in order to initiate a tuning process as a function thereof.

6. The string adjusting apparatus as claimed in claim 3, wherein said processing unit further determines an appropriate peg connector among said plurality of peg connectors as a function of said selected musical instrument and transmits an indication of said appropriate peg connector to said user interface in order to be communicated to said user.

7. The string adjusting apparatus as claimed in claim 6, wherein said processing unit is further configured to determine an appropriate torque to be applied by said motor as a function of said determined appropriate peg connector, and is further adapted to be connected to said motor for transmitting thereto an indication of said determined appropriate torque to be applied.

8. The string adjusting apparatus as claimed in claim 3 further comprising a communication interface connected to said processing unit and adapted to be connected to a data network for communicating with said tuning device and said motor.

9. The string adjusting apparatus as claimed in claim 8, wherein said communication interface is a wireless communication interface and said data network is a wireless data network.

10. A universal string tuning apparatus comprising:
 a tuning device for tuning a stringed musical instrument;
 a plurality of peg connectors configured to be detachably coupled to a variety of tuning pegs associated with a variety of musical instruments;
 a motor connected to said tuning device and adapted to be detachably coupled to said plurality of peg connectors;
 a portable housing for securely and compactly enclosing said tuning device, said plurality of peg connectors and said motor, where said housing comprises an opening allowing for packing and unpacking said plurality of peg connectors and said motor when required.

* * * * *